United States Patent [19]

Kishizono et al.

[11] Patent Number: 5,761,856
[45] Date of Patent: Jun. 9, 1998

[54] VIBRATION ISOLATION APPARATUS

[75] Inventors: Tsukasa Kishizono, Yokohama; Ikuo Shimoda, Fujisawa, both of Japan; William Henry Robinson, Eastbourne, New Zealand

[73] Assignee: Oiles Corporation, Japan

[21] Appl. No.: 718,510

[22] PCT Filed: Jul. 30, 1996

[86] PCT No.: PCT/JP96/02146

§ 371 Date: Oct. 18, 1996

§ 102(e) Date: Oct. 18, 1996

[87] PCT Pub. No.: WO97/06372

PCT Pub. Date: Feb. 20, 1997

[30] Foreign Application Priority Data

Aug. 4, 1995 [JP] Japan ................. 7-219593
Aug. 4, 1995 [JP] Japan ................. 7-219594
Aug. 7, 1995 [JP] Japan ................. 7-009134

[51] Int. Cl.$^6$ ................................. E04B 1/98
[52] U.S. Cl. ............. 52/167.8; 52/167.7; 52/573.1
[58] Field of Search ................. 52/167.1, 167.7, 52/167.8, 167.9, 573.1

[56] References Cited

U.S. PATENT DOCUMENTS

| | | |
|---|---|---|
| 4,117,637 | 10/1978 | Robinsons. |
| 4,499,694 | 2/1985 | Buckel et al. .................. 52/167.7 |
| 4,899,323 | 2/1990 | Fukahori et al. .................. 52/169.9 X |
| 5,324,117 | 6/1994 | Matsushita et al. .................. 52/167.1 X |

FOREIGN PATENT DOCUMENTS

| | | |
|---|---|---|
| 0 411 876 A1 | 2/1991 | European Pat. Off. . |
| 2-56204 | 4/1990 | Japan. |
| 3-163231 | 7/1991 | Japan. |

*Primary Examiner*—Robert Canfield
*Attorney, Agent, or Firm*—Nixon & Vanderhye

[57] ABSTRACT

A vibration isolating apparatus (5) includes: an elastic body (3) in which elastic material layers and rigid material layers are alternately superposed one on top of another; and a cylindrical lead member (4) which is disposed in a hollow portion (12) defined by an inner peripheral surface (9) of the elastic body (3), wherein a ratio Vp/Ve between a volume $V_p$ of the cylindrical lead member (4) and a capacity Ve of the hollow portion (12) in a state in which the cylindrical lead member (4) is not inserted and a load is applied to the elastic body (3) is 1.02 to 1.12.

28 Claims, 9 Drawing Sheets

VIBRATION ISOLATION APPARATUS

TECHNICAL FIELD

The present invention relates to an apparatus which is disposed between two structures so as to reduce vibration acceleration for the structure by absorbing relative horizontal vibrations between the two structures, and more particularly to a vibration isolating apparatus for reducing earthquake input acceleration by damping seismic energy so as to prevent damage to a structure such as a building, a bridge, or the like and to a vibration isolating system using at least one such vibration isolating apparatus.

BACKGROUND ART

As a vibrational energy absorber, one described in, for instance, Japanese Patent Application Publication No. 17984/1986 is known, and this vibrational energy absorber is fixed between two structures and has a lead member which undergoes plastic deformation as a shearing force is applied thereto. The lead member of such a vibrational energy absorber satisfactorily absorbs the vibrational energy in its plastic deformation without causing cracks or the like. After the deformation, however, the lead member of such a vibrational energy absorber does not return the absorbed energy to the structure unlike an ordinary spring, and maintains its deformed state, so that it is difficult to return the structure to its original position.

An elastic body serving as a vibration isolating apparatus in which elastic plates, which constitute elastic material layers and are formed of rubber or the like, and metal plates, which constitute rigid material layers, are alternately superposed one on top of another, and these members are bonded to each other by vulcanization or the like and are thereby secured to each other, reduces earthquake input acceleration and by and large protects the structure from the damaging force of an earthquake. However, such an elastic body has a low vibrational energy absorbing capability, and from the standpoint of earthquake engineering and vibration engineering there are various practical problems such as in that if the elastic body is used singly as a vibration isolating apparatus, in comparison with the above-described lead member a long time is required until the vibrations of the structure subjected to seismic vibrations subside.

Accordingly, a vibration isolating apparatus which is comprised of an elastic body and a cylindrical lead member disposed in and passed through the elastic body, has also been proposed in the aforementioned publication so as to be provided with the vibrational energy absorbing capability in the plastic deformation of the lead member and the earthquake-input-acceleration reducing capability and the restoring capability of the elastic body.

Figure 1:
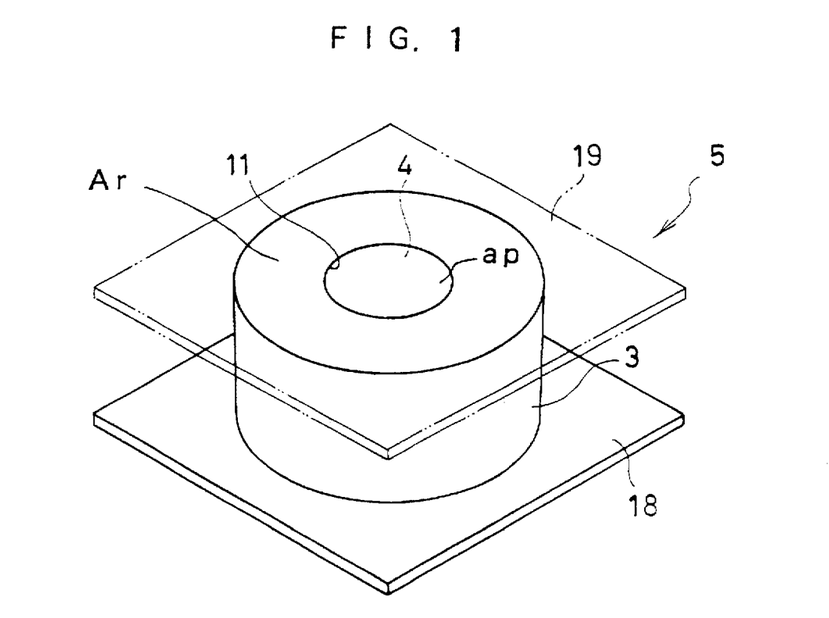
FIG. 1 is a perspective view of a vibration isolating apparatus in accordance with the present invention.
Figure 2:
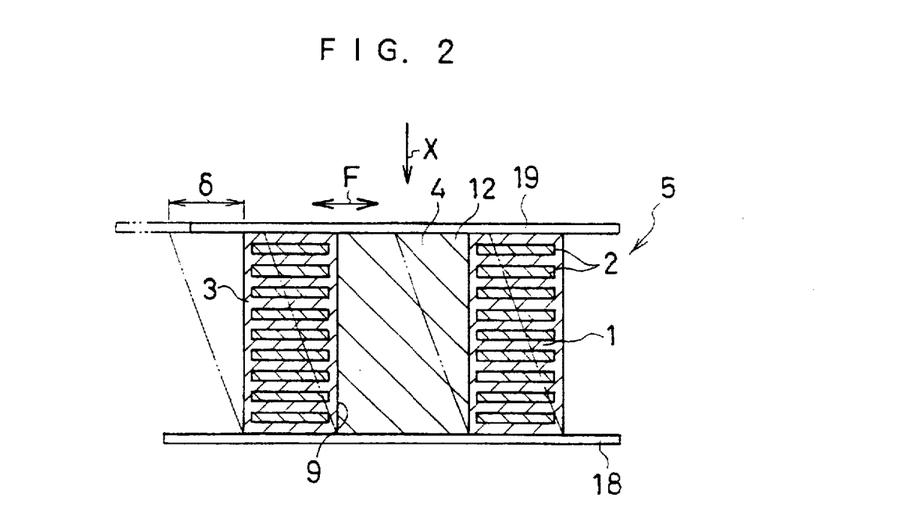
FIG. 2 is a cross-sectional view of the vibration isolating apparatus shown in FIG. 1.

A vibration isolating apparatus 5 shown in FIGS. 1 and 2 is comprised of an annular elastic body 3 in which elastic plates 1, which constitute elastic material layers and are formed of rubber or the like, and annular rigid plates 2, which constitute rigid material layers, are alternately superposed one on top of another and are secured to each other; a cylindrical lead member 4 which is disposed in a hollow portion 12 defined by a cylindrical inner peripheral surface 9 of the elastic body 3; and flange plates 18 and 19 which are respectively attached to a lower surface and an upper surface of the elastic body 3 by means of bolts or the like by abutting respectively against a lower surface and an upper surface of the cylindrical lead member 4. The vibration isolating apparatus 5 is used in a state in which the flange plate 18 side is fixed to one structure such as a base, and the other structure such as a building is placed on the flange plate 19 side so as to receive a normal load X from the building or the like via the flange plate 19.

Figure 5:
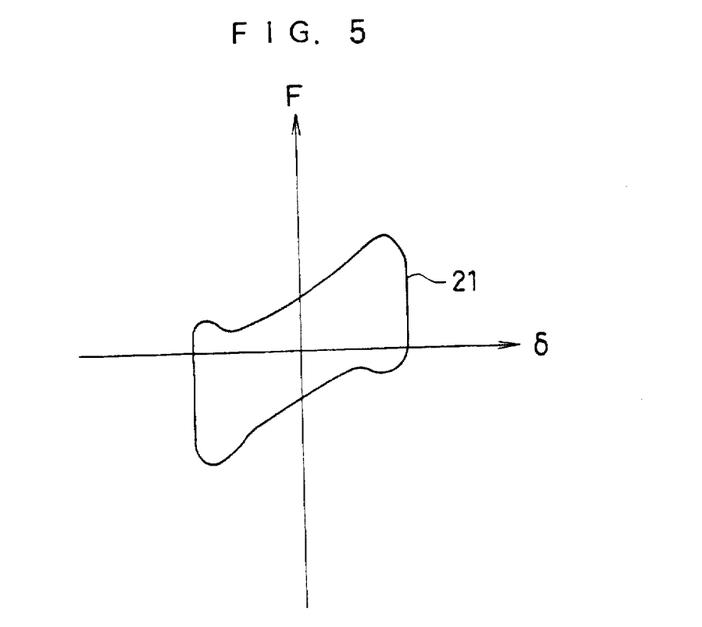
FIG. 5 is a diagram for explaining the operation of the vibration isolating apparatus.

In such a vibration isolating apparatus 5, unless the cylindrical lead member 4 disposed in the hollow portion 12 is restrained by the elastic body 3 without a gap, in the event that a lateral force (horizontal force) F due to an earthquake has occurred, a gap is produced between the inner peripheral surface 9 of the elastic body 3 and the cylindrical outer peripheral surface of the cylindrical lead member 4 abutting against the same. Consequently, the relationship between the horizontal force F and a lateral displacement (horizontal displacement) δ assumes an unstable characteristic as shown by a hysteresis curve 21 in FIG. 5. Hence, a large effect due to the cylindrical lead member 4 cannot be obtained, thereby making it difficult to obtain a desired vibration isolating effect. Meanwhile, if the cylindrical lead member 4 is restrained by the elastic body 3 more than is necessary, the elastic material layers of the elastic body 3 are excessively compressed in the plastic deformation of the cylindrical lead member 4 in the lateral force F due to the earthquake. This also results in early deterioration of the elastic material layers of the elastic body 3, thereby presenting a problem in durability. In addition, there is a limit to the amount of the lead member press-fitted in the hollow portion 12 of the elastic body 3 to form the cylindrical lead member 4, and it is difficult to press-fit lead of a fixed amount or more into the hollow portion 12 of the elastic body 3. If the press-fitting is carried out forcibly, there is the risk of the elastic body 3 itself becoming damaged.

In the vibration isolating apparatus 5 shown in FIGS. 1 and 2, if lateral displacement repeatedly occurs due to a number of earthquakes, peripheral edge portions of upper and lower surfaces of the cylindrical lead member 4 are rounded. Consequently, there is the possibility of annular gaps occurring between the peripheral edge portions and the elastic body 3.

Figure 3:
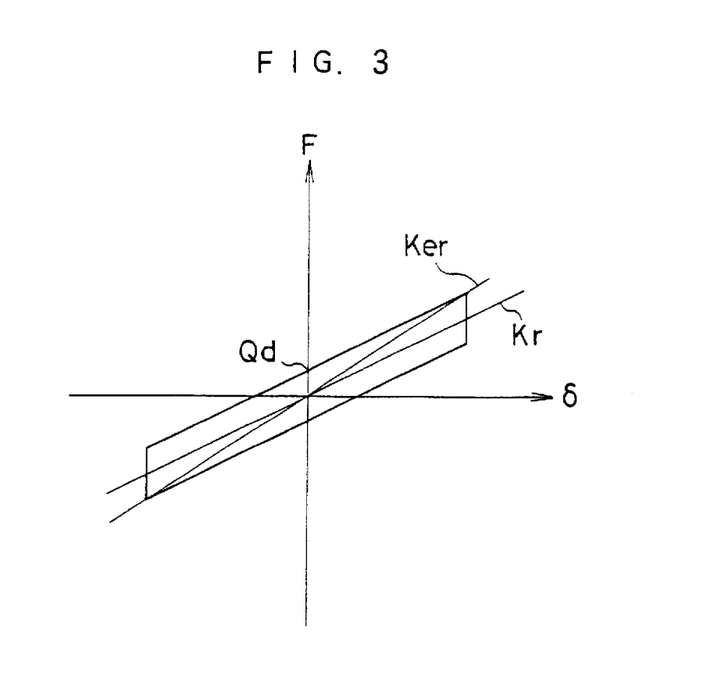
FIG. 3 is a diagram for explaining the operation of the vibration isolating apparatus.
Figure 4:
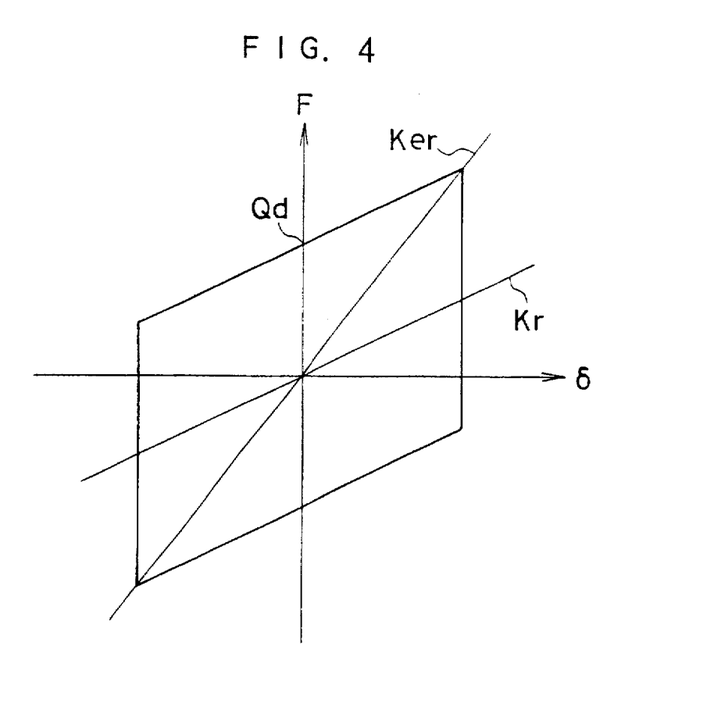
FIG. 4 is a diagram for explaining the operation of the vibration isolating apparatus.

In addition, the relationship between the lateral force F and the lateral displacement δ in a case where the lateral force F has occurred to the above-described vibration isolating apparatus 5 owing to an earthquake depicts a hysteresis curve such as the one shown in FIG. 3 in a case where diagonal rigidity Ker and the lateral (horizontal) rigidity Kr of the elastic body 3 are approximately equivalent, i.e., if a shear yield load characteristic value Qd based on the shear yield load Au of the cylindrical lead member 4 restrained by the elastic body 3 without a gap becomes small (in a case where a hysterisis curve is expressed by a bilinear characteristic, the characteristic value Qd and the shear yield load Au are set to be in a relationship of Qd=0.8 Au in design for the convenience'sake; in the present invention, the characteristic value Qd will be referred to as the shear yield load). Meanwhile, in a case where the diagonal rigidity Ker is greater than the rigidity Kr, i.e., if the shear yield load Qd of the cylindrical lead member 4 restrained by the elastic body 3 without a gap becomes large, the relationship depicts a hysteresis curve such as the one shown in FIG. 4. Here, the shear yield load Qd is expressed by the following Formula (1):

$$Qd = ap \cdot \sigma pd \qquad (1)$$

In Formula (1), ap is the area of the shear plane of the cylindrical lead member 4 (in the present invention, ap is defined by a cross-sectional area of the cylindrical lead member 4 surrounded by the inner peripheries of the rigid material layers), and corresponds to the area of the shear plane of the cylindrical lead member 4 with respect to the lateral force F applied to the vibration isolating apparatus 5; and σpd is the shear yield stress (hereafter referred to as the design shear yield stress) of the cylindrical lead member 4 itself which is not restrained by the elastic body 3 without a gap, and in the case of pure lead (with the purity of 99.9% or more), σpd in terms of a design value is 85 kg/cm$^2$ in the vibration of 0.5 Hz and the strain amplitude of 50% or more.

In the vibration isolating apparatus 5 which depicts a hysteresis curve such as the one shown in FIG. 3, in an earthquake, although its vibration isolating effect with respect to the same excels, the relative displacement between the structure placed thereon and the base is large, afterquakes subsequent to the earthquake continue for a relatively long period, and there is the risk of resonating in the case of earthquake vibrations having large long-period components. Further, at the time of a strong wind such as a typhoon, there are cases where the placed structure shakes substantially. Meanwhile, the period of dynamic natural vibration based on the vibration isolating apparatus 5 is given by the diagonal rigidity Ker shown in FIGS. 3 and 4. However, in the vibration isolating apparatus 5 which depicts a hysteresis curve such as the one shown in FIG. 4, even if the rigidity Kr is relatively small, if the diagonal rigidity Ker is large, the shear yield load Qd of the cylindrical lead member 4 becomes large, a long period sufficient for demonstrating the vibration isolating effect becomes difficult to obtain. As a result, the vibration isolating effect deteriorates.

In addition, a requirement for ensuring the shear yield load Qd of the cylindrical lead member 4 in accordance with Formula (1) is that while and after periodic shear deformation takes place, the cylindrical lead member 4 is restrained without a gap by the elastic material layers and the rigid material layers which constitute the elastic body.

The present invention has been devised in view of the above-described aspects, and it is an object of the present invention to provide a vibration isolating apparatus which is capable of obtaining a stable vibration isolating characteristic as a result of the fact that the cylindrical lead member disposed in the hollow portion of the elastic body can be restrained without a gap as required, and which is capable of avoiding the fatigue and damage of the elastic material layers of the elastic body and the cylindrical lead member, and excels in durability, the vibration isolating effect, and manufacturing efficiency.

Another object of the present invention is to provide a vibration isolating apparatus wherein, by focusing on the relationship between the shear yield load Qd and the supporting load W of the elastic body which will be described later, a ratio between an area ap of the shear plane of the cylindrical lead member and an area Ar of the load surface of the elastic body, which is obtained from that relationship, is set in a predetermined range, whereby the vibration isolating apparatus excels in the vibration isolating effect, makes it possible to reduce the relative displacement between the structure and the base, and is capable of dampening afterquakes subsequent to an earthquake at an early period, of reducing the lateral shaking of the structure placed thereon even at the time of a strong wind such as a typhoon, and of obtaining a long period sufficient for demonstrating the vibration isolating effect so as to eliminate the risk of resonating in earthquake vibrations having long-period components.

Still another object of the present invention is to provide a vibration isolating system using at least one vibration isolating apparatus described above.

DISCLOSURE OF INVENTION

In accordance with the present invention, the above-described objects are attained by a vibration isolating apparatus comprising: a columnar lead member; an elastic body in which an elastic material layer and rigid material layers are alternately superposed one on top of another; and a hollow portion which is defined by at least an inner peripheral surface of the elastic body and in which the columnar lead member is disposed tightly, wherein the rigid material layers include a pair of thick rigid plates which are respectively disposed on both end surface sides of the elastic body, and one end portion of the columnar lead member is disposed tightly in one end portion of the hollow portion, which is defined by an inner peripheral surface of one of the pair of thick rigid plates, while another end portion of the columnar lead member is disposed tightly in another end portion of the hollow portion, which is defined by an inner peripheral surface of another one of the pair of thick rigid plates, and wherein a ratio Vp/Ve between a volume Vp of the columnar lead member disposed in the hollow portion and a capacity Ve of the hollow portion in a state in which the columnar lead member is not inserted and a load is applied to the elastic body is 1.02 to 1.12.

Further, in accordance with the present invention, the above-described objects are attained by a vibration isolating apparatus comprising: an elastic body in which an elastic material layer and rigid material layers are alternately superposed one on top of another; and at least one columnar lead member which is disposed in and passed through the elastic body, the columnar lead member being restrained in a shearing direction by the elastic body without a gap such that a shear yield load Qd of the columnar lead member becomes the product of an area ap of a shear plane of the columnar lead member and a design shear yield stress σpd of the columnar lead member, wherein a ratio Σap/Ar between a total area Σap of the shear plane of the columnar lead member and an area Ar of a load surface of the elastic body is in the range of 0.01 to 0.12.

Still further, in accordance with the present invention, the above-described objects are attained by a vibration isolating apparatus comprising: at least one columnar lead member; an elastic body in which an elastic material layer and rigid material layers are alternately superposed one on top of another; and at least one hollow portion which is defined by at least an inner peripheral surface of the elastic body and in which the columnar lead member is disposed tightly, wherein a ratio Σap/Ar between a total area Σap of a shear plane of the columnar lead member and an area Ar of a load surface of the elastic body is in the range of 0.01 to 0.12, and a ratio Vp/Ve between a volume Vp of the columnar lead member disposed in the hollow portion and a capacity Ve of the hollow portion in a state in which the columnar lead member is not inserted and a load is applied to the elastic body is 1.02 to 1.12.

In the foregoing two vibration isolating apparatuses as well, it is preferred that the rigid material layers include a pair of thick rigid plates which are respectively disposed on both end surface sides of the elastic body, and one end portion of the columnar lead member be disposed tightly in one end portion of the hollow portion, which is defined by an inner peripheral surface of one of the pair of thick rigid plates, while another end portion of the columnar lead member is disposed tightly in another end portion of the hollow portion, which is defined by an inner peripheral surface of another one of the pair of thick rigid plates.

The present invention has been devised on the basis of the knowledge that the durability, the vibration isolating effect, and the manufacturing efficiency particularly excel in the case of a vibration isolating apparatus which has a fixed relationship between the volume Vp of the columnar lead member disposed in the hollow portion and the capacity Ve of the hollow portion defined by the inner peripheral surface of the elastic body, specifically the capacity of the hollow portion prior to the disposition of the columnar lead member, i.e., before the press-fitting of lead for forming the columnar lead member and in the state in which a load is applied to the elastic body (the hollow portion in this state will be hereafter referred to as the reduced hollow portion).

That is, in the vibration isolating apparatus in accordance with the present invention, the ratio Vp/Ve between the volume Vp of the columnar lead member disposed in the hollow portion and the capacity Ve of the reduced hollow portion is in the range of 1.02 to 1.12. The capacity Ve of the reduced hollow portion increases or decreases in correspondence with the normal load applied to the elastic body, i.e., the weight of the structure supported by the vibration isolating apparatus, and differs from the capacity Ve of the hollow portion in a state in which the columnar lead member having a volume which is more than 1.00 time the capacity Ve of the reduced hollow portion is disposed. In the vibration isolating apparatus in which the columnar lead member having a volume which sufficiently exceeds 1.00 time the capacity Ve of the reduced hollow portion is disposed, as in the example shown in FIG. 6, at a peripheral surface 9 of an elastic body 3 defining a hollow portion 12, a cylindrical lead member 4 bites into elastic plates 1 made of rubber or the like and constituting elastic material layers of the elastic body 3, thereby forming an annular concave surface 31 at the position of each elastic plate 1 and forming an annular convex surface 32 at the position of each annular metal plate 2 constituting each rigid material layer.

In a case where the cylindrical lead member 4 having a volume which is less than 1.00 time (ratio Vp/Ve=1.00) the capacity Ve of the reduced hollow portion is disposed, a gap is liable to be produced between the inner peripheral surface 9 of the elastic body 3 and the outer peripheral surface of the cylindrical lead member 4 facing and abutting against the inner peripheral surface 9. Accordingly, a gap is readily produced during the operation of a vibration isolating apparatus 5, i.e., while the lateral force F is being repeatedly applied to the vibration isolating apparatus 5, thereby exhibiting an unstable vibration isolating characteristic such as the one shown by the hysteresis curve 21. It is conjectured that this is because the cylindrical lead member 4 is not restrained by the elastic body 3 without a gap at least in the shearing direction, deformation other than shear deformation occurs, and the cylindrical lead member 4 does not exhibit a design shear yield stress (normally, a design value of 85 kg/cm$^2$ in the case of lead with the purity of 99.9% or more).

Figure 6:
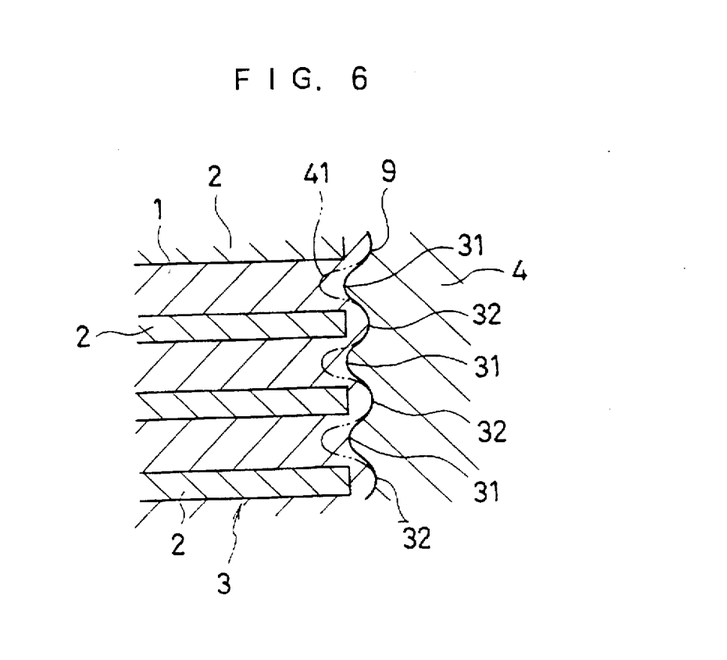
FIG. 6 is a partial enlarged cross-sectional view of the vibration isolating apparatus shown in FIG. 1.

Meanwhile, in a case where the cylindrical lead member 4 having a volume which is more than 1.12 times (ratio Vp/Ve=1.12) the capacity Ve of the reduced hollow portion is disposed, the cylindrical lead member 4 substantially bites into the elastic plates 1, so that the inner peripheral surface 9 of the elastic body 3 becomes an excessively concave surface as shown by reference numeral 41 in FIG. 6, and the shear stress in the vicinity of this position at the elastic plate 1 becomes excessively large with respect to the rigid plate 2. If the state is one in which the stress has occurred excessively, the deterioration of the elastic plates 1 is accelerated, and the durability becomes inferior. In addition, it was found that it is difficult to press-fit lead having a volume which is more than 1.12 times the capacity Ve of the reduced hollow portion in order to form the cylindrical lead member 4 in the hollow portion 12 in the manufacture of the vibration isolating apparatus 5, since the press-fitting pressure must be set to an extremely high level, and there is the risk of damaging the elastic body 3 by the press-fitting.

Incidentally, as is apparent from the embodiments described below, in a case where the function whereby high rigidity is exhibited with respect to an input of small vibrations and low rigidity is exhibited with respect to an input of large vibrations, i.e., the so-called trigger function, is particularly required, and in order to satisfactorily cope with earthquake vibrations of large amplitude in particular, it is preferred that the ratio Vp/Ve should be 1.02 or more. Further, if the ratio Vp/Ve is in the range of 1.02 to 1.07, an excellent manufacturing characteristic can be obtained.

In the vibration isolating apparatus 5 such as the one shown in FIG. 2, if a number of earthquakes occur, annular gaps can occur between the elastic body 3 and the peripheral edge portions of the upper and lower surfaces of the cylindrical lead member 4, so that the vibration isolating characteristic can become unstable due to the annular gaps over a long period of use. In the present invention, however, both end portions of the columnar lead member are respectively disposed tightly in both end portions of the hollow portion which are defined by the inner peripheral surfaces of the respective thick rigid plates, thereby to prevent the occurrence of the annular gaps and prevent the deterioration of the vibration isolating characteristic.

In addition, in the vibration isolating apparatus in which the columnar lead member is restrained by the elastic body without a gap such that the shear yield load Qd of the columnar lead member becomes the product of the area ap of the shear plane of the columnar lead member and the design shear yield stress σpd of the columnar lead member, the characteristic required of the apparatus can be evaluated by the ratio between the shear yield load Qd of the columnar lead member and the support load W of the elastic body with respect to the placed structure. By taking note of this fact, the present invention has been devised on the basis of the knowledge that if the ratio Qd/W between the shear yield load Qd and the support load W is smaller than 0.02, the relative displacement between the placed structure and the base is large, afterquakes subsequent to an earthquake continue for a relatively long period, there is the risk of resonating in earthquake vibrations having large long-period components, and there is the risk of the placed structure shaking substantially at the time of a strong wind such as a typhoon, whereas if the ratio Qd/W is larger than 0.08, it is difficult to elongate the period, with the result that the vibration isolating effect deteriorates.

In the vibration isolating apparatus 5, the shear yield load Qd of the cylindrical lead member 4 is given by the above Formula (1), and the support load W of the elastic body 3 is given by $$W = Ar \cdot P \qquad (2)$$

where Ar is the area of the load surface of the elastic body 3, and corresponds to the pressure-receiving area of the elastic body 3 with respect to the normal load X applied to the vibration isolating apparatus 5, i.e., the support load W; and P is an average compressive stress of the elastic body 3 with respect to the normal load X applied to the vibration isolating apparatus 5, and a value of 60 kg/cm$^2$ to 130 kg/cm$^2$ or thereabouts is normally used in the design of the vibration isolating apparatus.

The ratio Qd/W is expressed by $$\frac{Qd}{W} = \frac{ap \cdot \sigma pd}{Ar \cdot P} = 0.02 \text{ to } 0.08$$

where if it is assumed that $\sigma pd=80$ kg/cm$^2$, and that $P=130$ kg/cm$^2$, the upper limit of the ratio Qd/W, i.e., the upper limit of ap/Ar, is about 0.12, and if it is assumed that $\sigma pd=100$ kg/cm$^2$, and that $P=60$ kg/cm$^2$, the lower limit of the ratio Qd/W, i.e., the lower limit of ap/Ar, is about 0.01. Incidentally, the value of the design shear yield stress $\sigma pd$ mentioned above is a value in the vibration of 0.5 Hz and the strain amplitude of 50% or more.

That is, if the ratio ap/Ar between the area ap of the shear plane of the columnar lead member and the area Ar of the load surface of the elastic body is set in the range of 0.01 to 0.12, the vibration isolating effect excels, the relative displacement between the structure and the base can be made small, the lateral shaking of the placed structure can be reduced even during a strong wind such as a typhoon, a long period can be obtained, and it can be said that the risk of resonance even in the case of earthquake vibrations having long-period components can be substantially eliminated.

It should be noted that, as will be apparent from the embodiments described below, it became clear that if the ratio ap/Ar is set in the range of 0.02 to 0.07, it is possible to obtain more favorable results, and that if the ratio ap/Ar is set in the range of 0.03 to 0.06, it is possible to obtain even more favorable results.

The same holds true of the case where a plurality of columnar lead members are disposed in one elastic body. Namely, in the present invention including this case as well, the ratio Σap/Ar between the total area Σap of the shear plane of the columnar lead member and the area Ar of the load surface of the elastic body is set in the aforementioned range.

Furthermore, the present invention has been devised on the basis of the knowledge that if the volume Vp of the above-described columnar lead member and the capacity Ve of the reduced hollow portion are set in the aforementioned fixed relationship, the columnar lead member is restrained without a gap by the elastic material layer and the rigid material layers which constitute the elastic body, with the result that the shear yield load Qd of the columnar lead member, which conforms to Formula (1), can be ensured, and it is possible to provide a vibration isolating apparatus which particularly excels in the durability, the vibration isolating effect, and the manufacturing efficiency in addition to the above-described effects.

That is, in the vibration isolating apparatus in accordance with the present invention, in addition to the aforementioned area ratio, the ratio Vp/Ve between the volume Vp of the columnar lead member disposed in the hollow portion and the capacity Ve of the reduced hollow portion is in the range of 1.02 to 1.12. In this vibration isolating apparatus as well, the columnar lead member may be caused to bite into each elastic material layer of the elastic body so that the inner peripheral surface of the elastic body defining the hollow portion is formed as a concave surface at the position of the elastic material layer and as a convex surface at the position of each rigid material layer.

In the present invention, as the material of the elastic material layer, it is possible to cite natural rubber, silicone rubber, high-damping rubber, urethane rubber, chloroprene rubber, or the like, but natural rubber is preferable. As the thickness of each elastic material layer, a range of 1 mm to 30 mm or thereabouts in the state of no load is preferable, but the thickness is not limited to the same. In addition, as the material of the rigid material layer, it is possible to cite, among others, a steel plate, or a fiber-reinforced composite resin plate or fiber-reinforced hard rubber plate using carbon fibers, glass fibers, aramid fibers or the like, and as for its thickness, a range of 10 mm to 50 mm or thereabouts is preferable for each thick rigid plate, and a range of 1 mm to 6 mm or thereabouts is preferable for the other layers, but the thickness is not particularly limited to the same. Further, the number of such plates used is not particularly limited, either. The elastic body and the columnar lead member are preferably an annular body and a cylindrical body, respectively, or bodies of other shapes, such as an ellipse or a square and an ellipse or a square, respectively. The columnar lead member which is disposed in and passed through the elastic body may be singular. Alternatively, the vibration isolating apparatus may be constructed such that a plurality of hollow portions are formed in one elastic body and columnar lead members are respectively disposed in the plurality of hollow portions. Incidentally, the columnar lead members in the plurality of hollow portions need not be disposed under the aforementioned identical condition concerning the ratio Vp/Ve, and may be respectively disposed under different conditions. In addition, although it is preferred that the columnar lead members satisfy the aforementioned condition concerning the ratio Vp/Ve, some of the plurality of columnar lead members may be disposed in such a manner as not to satisfy the aforementioned condition concerning the ratio Vp/Ve.

In addition, the present invention is also applicable to a vibration isolating system in which at least one vibration isolating apparatus, preferably a plurality of vibration isolating apparatuses, of the above-described type are disposed between a structure and a base, the vibration isolating apparatus comprising: an elastic body in which an elastic material layer and rigid material layers are alternately superposed one on top of another; and a columnar lead member disposed in at least one hollow portion defined by an inner peripheral surface of the elastic body. In this case, it suffices if the columnar lead member is restrained by the elastic body without a gap such that the shear yield load Qd of the columnar lead member becomes the product of the area ap of the shear plane of the columnar lead member and the design shear yield stress $\sigma pd$ of the columnar lead member, and if the ratio Σap/ΣAr between the total area Σap of the shear plane of the columnar lead member and the total area ΣAr of the load surface of the elastic body is in the range of 0.01 to 0.12. In addition, the above-described advantage can be similarly obtained if the ratio Σap/ΣAr between the total area Σap of the shear plane of the columnar lead member and the total area ΣAr of the load surface of the elastic body is in the range of 0.01 to 0.12, and if the ratio Vp/Ve between the volume Vp of the columnar lead member disposed in the hollow portion and the capacity Ve of the hollow portion (the reduced hollow portion) in the state in which the columnar lead member is not inserted and a load is applied to the elastic body is 1.02 to 1.12. In this system as well, if the ratio Σap/ΣAr is set in the range of 0.02 to 0.07, it is possible to obtain more favorable results, and if the ratio Σap/ΣAr is set in the range of 0.03 to 0.06, it is possible to obtain even more favorable results. Meanwhile, if the ratio Vp/Ve is in the range of 1.02 to 1.07, it is possible to obtain a favorable manufacturing characteristic.

In addition, in the vibration isolating apparatus of this system, at the inner peripheral surface of the elastic body defining the hollow portion, the columnar lead member may bite into the elastic material layer of the elastic body such that a concave surface is formed at the position of the elastic material layer, and convex surfaces are formed at positions of the rigid material layers. Incidentally, in the system in which a plurality of vibration isolating apparatuses are disposed, the plurality of vibration isolating apparatuses need not be disposed under the aforementioned identical condition concerning the ratio Vp/Ve, and may be respectively disposed under different conditions. In addition, although it is preferred that the vibration isolating apparatuses satisfy the aforementioned condition concerning the ratio Vp/Ve, some of the plurality of vibration isolating apparatuses may be disposed in such a manner as not to satisfy the aforementioned condition concerning the ratio Vp/Ve.

Furthermore, in the above-described system in which at least one vibration isolating apparatus provided with the columnar lead member is disposed between the structure and the base, at least one other vibration isolating apparatus provided with a solid elastic body which has no hollow portion and in which an elastic material layer and rigid material layers are alternately superposed one on top of another, may also be disposed between the structure and the base, together with the vibration isolating apparatus having the columnar lead member.

In such a system in which at least one vibration isolating apparatus provided with the columnar lead member and at least one vibration isolating apparatus not provided with the columnar lead member but provided with a solid elastic body are disposed between the structure and the base, each vibration isolating apparatus is constructed such that the ratio Σap/ΣAr satisfies the aforementioned condition, by causing the total area ΣAr of the load surface of the elastic body to include that of the load surface of the solid elastic body of the vibration isolating apparatus not provided with the columnar lead member.

In accordance with the present invention, since the columnar lead member disposed in the hollow portion of the elastic body can be restrained as desired, it is possible to provide a vibration isolating apparatus which makes it possible to obtain a stable vibration-isolating characteristic, which has a trigger function and is capable of satisfactorily coping with earthquake vibrations of large amplitude, which is capable of avoiding the deterioration of the elastic material layer of the elastic body and the columnar lead member, and which particularly excels in durability, the vibration isolating effect, and manufacturing efficiency.

In addition, in accordance with the present invention, since the ratio Σap/Ar between the total area Σap of the shear plane of the columnar lead member and the area Ar of the load surface of the elastic body is set in a predetermined range, it is possible to provide a vibration isolating apparatus which excels in the vibration isolating effect, makes it possible to reduce the relative displacement between the structure and the base, and is capable of dampening afterquakes subsequent to an earthquake at an early period, of reducing the lateral shaking of the structure placed thereon even at the time of a strong wind such as a typhoon, and of obtaining a long period sufficient for demonstrating the vibration isolating effect so as to eliminate the risk of resonating in earthquake vibrations having long-period components.

Hereafter, a description will be given of the present invention with reference to the embodiments shown in the drawings. It should be noted that the present invention is not limited to these embodiments.

EMBODIMENTS

Figure 7:
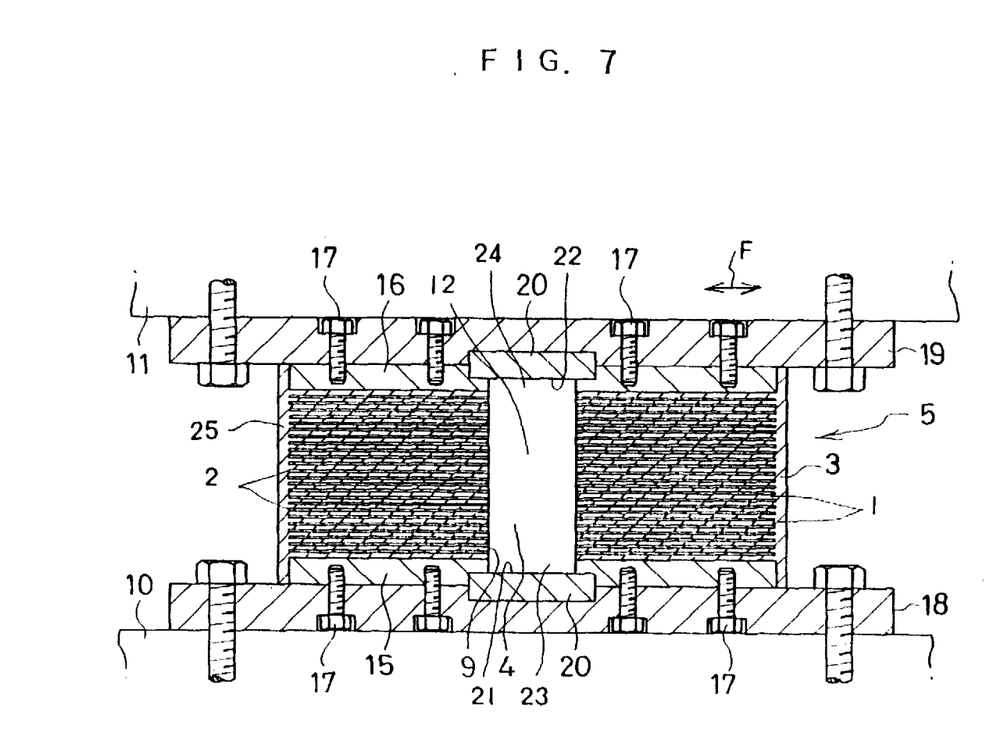
FIG. 7 is a cross-sectional view of a preferred embodiment of the present invention.

A vibration isolating apparatus 5 of this example shown in FIG. 7 is comprised of an annular elastic body 3 in which elastic material layers formed of annular elastic plates 1 on the one hand, and rigid material layers formed of thin annular rigid steel plates 2 and thick annular rigid steel plates 15, 16 on the other, are alternately superposed one on top of another; a cylindrical lead member 4 which is disposed tightly in a hollow portion 12 defined by a cylindrical inner peripheral surface 9 of the elastic body 3; flange plates 18 and 19 which are respectively connected to the steel plates 15 and 16 by means of bolts 17; and shear keys 20 for fixing the flange plates 18 and 19 and the steel plates 15 and 16 with respect to each other in a shearing direction (F direction) at a lower surface and an upper surface of the cylindrical lead member 4. The hollow portion 12 in which the cylindrical lead member 4 is tightly disposed is defined by not only the inner peripheral surface 9 but also an upper surface 21 of the lower shear key 20 and a lower surface 22 of the upper shear key 20.

In the vibration isolating apparatus 5, the steel plates 15 and 16 are disposed by being embedded in the elastic material layers on the sides of the upper and lower end surfaces of the elastic body 3. A lower end portion 23 of the cylindrical lead member 4 is disposed tightly in a lower end portion of the hollow portion 12, which is defined by the inner peripheral surface of the steel plate 15, while an upper end portion 24 of the cylindrical lead member 4 is disposed tightly in an upper end portion of the hollow portion 12, which is defined by the inner peripheral surface of the steel plate 16. This vibration isolating apparatus 5 is used in a state in which the flange plate 18 side is connected to a base 10 and the flange plate 19 side is connected to a structure 11. In this example, 25 annular elastic plates 1 made of natural rubber and each having a thickness of 5 mm were used to form the elastic material layers, and 22 annular steel plates 2 each having a thickness of 2.3 mm and the annular steel plates 15 and 16 each having a thickness of 31 mm were used to form the rigid material layers.

To manufacture the vibration isolating apparatus 5 in accordance with the present invention, the annular elastic plates 1 and the steel plates 2 are first alternately laminated one on top of another, the annular steel plates 15 and 16 are disposed on a lower surface and an upper surface of the laminated assembly, and these plates are fixed to each other by vulcanization bonding or the like under pressure in a mold, thus preparing the annular elastic body 3. Subsequently, to form the cylindrical lead member 4 in the hollow portion 12, lead is press-fitted into the hollow portion 12 of the elastic body 3. The press-fitting of the lead is carried out by pressing lead into the hollow portion 12 by means of a hydraulic ram or the like such that the cylindrical lead member 4 is restrained by the elastic body 3 in the hollow portion without a gap. After the press-fitting of the lead, the shear key 20 and the flange plates 18 and 19 are attached. Incidentally, in the formation of the elastic body 3 by the vulcanization bonding in the mold under pressure, it is preferable to form a cylindrical coating layer 25 in such a manner as to cover the outer peripheral surfaces of the steel plates 2, 15, and 16. The thickness of the coating layer in this example was 10 mm.

In addition, in the above-described formation, a cylindrical coating layer, which is similar to the cylindrical coating layer 25 but is very thinner than the same, may be formed so as to cover the inner peripheral surfaces of the steel plates 2, 15 and 16 as part of the elastic plates 1 on the inner peripheral side thereof is fluidized.

In the vibration isolating apparatus 5, such as the one shown in FIG. 7, in which the height of the elastic body 3 was 240 mm in a state of no load, by varying the ratio ap/Ar, the vibrational energy Es imparted to the structure 11 by the vibrational energy Eb in the base 10 at each ratio ap/Ar was determined. The obtained relationship between the ratio ap/Ar and the energy transmission rate Es/Eb based on the vibration isolating apparatus 5 is shown in FIG. 8.

Incidentally, this energy transmission rate was determined by setting the surface pressure of the vibration isolating apparatus 5 as 80 kg/cm$^2$, by setting the modulus of shearing elasticity G of the elastic plate 1 as 6 kg/cm$^2$, by using as inputs El Centro Earthquake waves, Tokachi Offing Earthquake waves, Hachinohe Earthquake waves, and Taft Earthquake waves, and by performing statistical processing with respect to the same.

Figure 8:
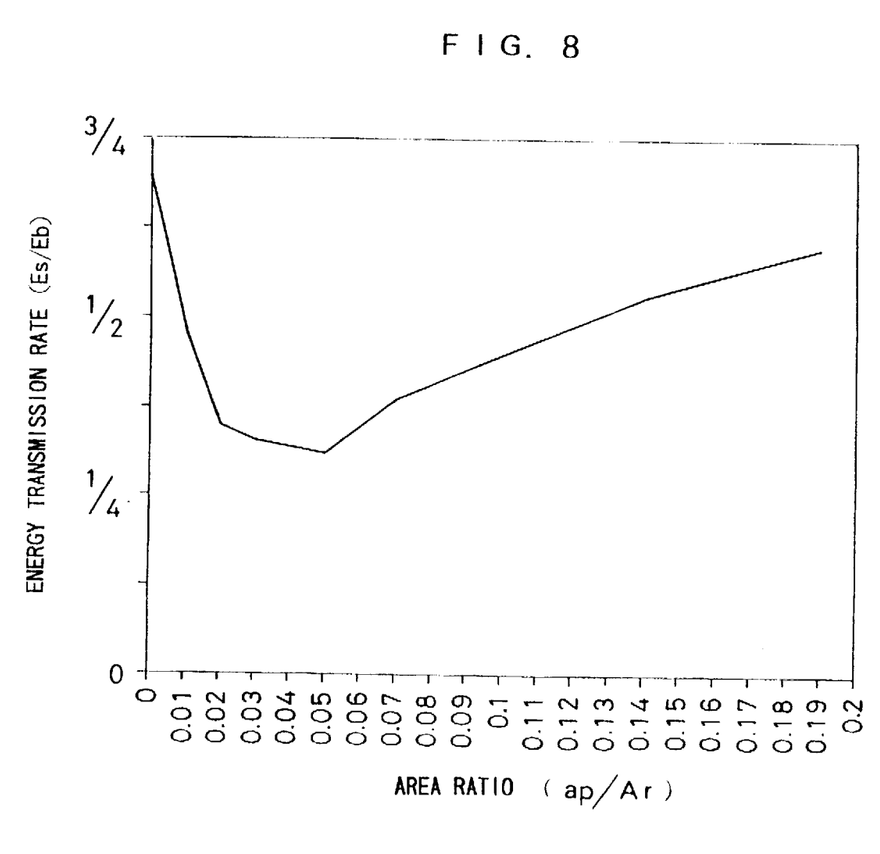
FIG. 8 is a diagram illustrating the effect of the embodiment shown in FIG. 7.

As is apparent from FIG. 8, if the ratio ap/Ar is in the range of 0.01 to 0.12, the energy transmission rate Es/Eb becomes ½ or less, and it can be appreciated that the vibrational energy in the base 10 is sufficiently dampened and is transmitted to the structure 11. In addition, it was also confirmed that if the ratio ap/Ar is more than 0.12, the response-acceleration ratio (response/input) becomes approximately 50% or more. Further, it was also found that if the ratio ap/Ar is less than 0.01, the relative displacement between the structure 11 and the base 10 occurs by an amount which is not less than two to three times that in the case of, for instance, the preferable ratio ap/Ar=0.05, which is therefore unsuitable for practical use.

Further, in a case where the ratio ap/Ap is in the range of 0.02 to 0.07, and in the range of 0.03 to 0.06, as is apparent from FIG. 8, it can be seen that it is possible to obtain more favorable energy transmission rates Es/Eb, respectively.

Figure 9:
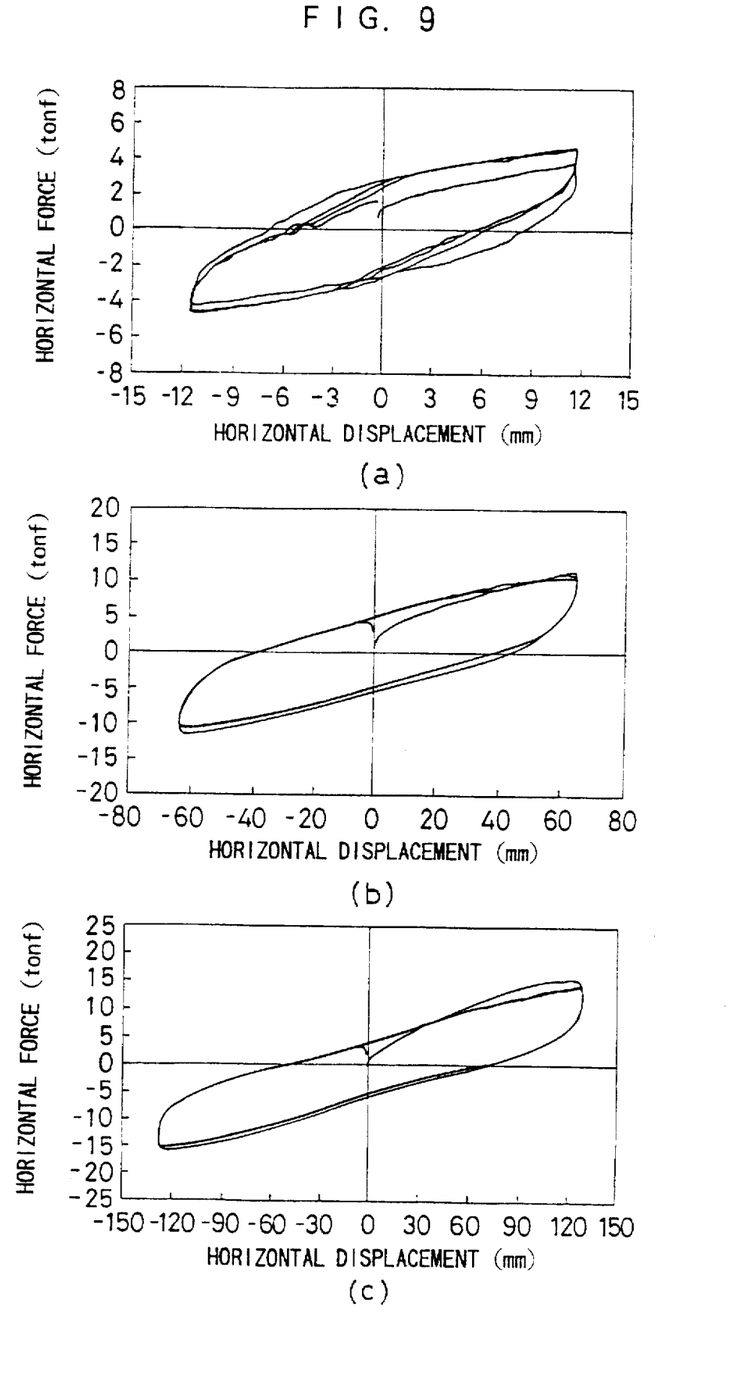
FIG. 9 is a diagram illustrating the effect of the embodiment shown in FIG. 7.
Figure 10A:
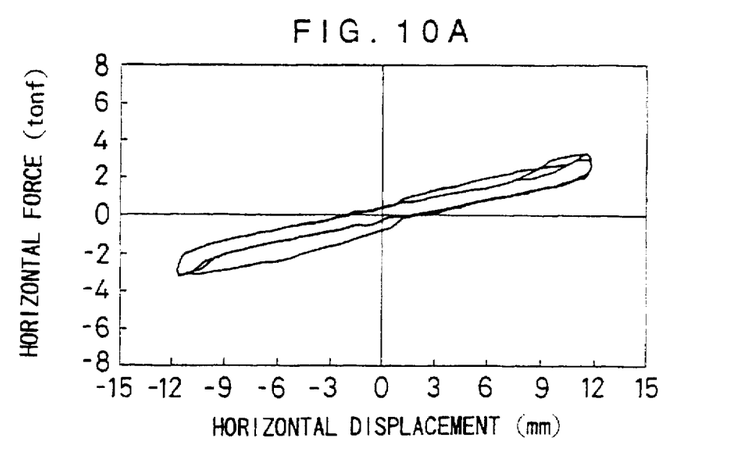
FIG. 10 is a diagram illustrating the effect of the embodiment shown in FIG. 7.
Figure 10B:
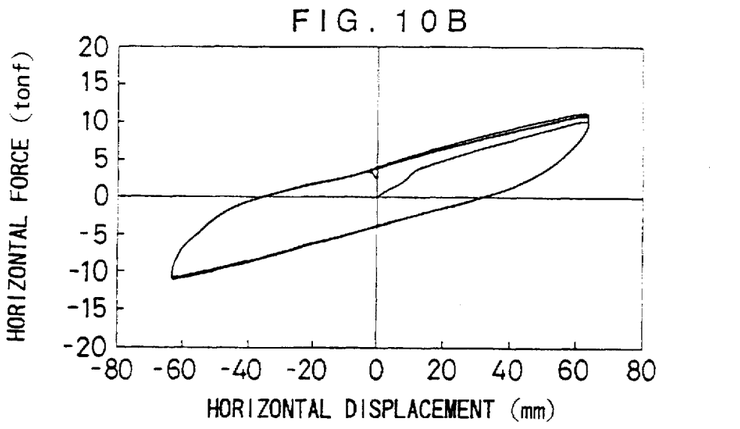
Figure 10C:
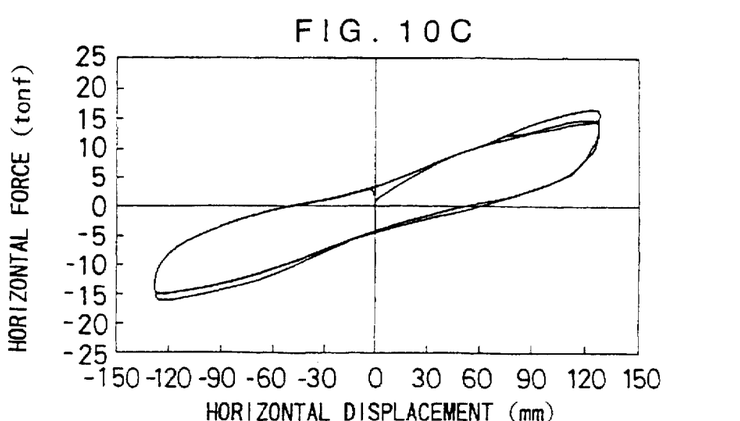
Figure 11A:
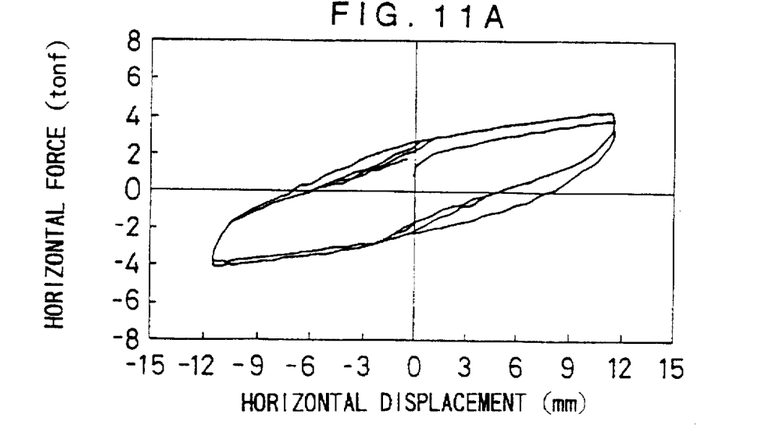
FIG. 11 is a diagram illustrating the effect of the embodiment shown in FIG. 7.
Figure 11B:
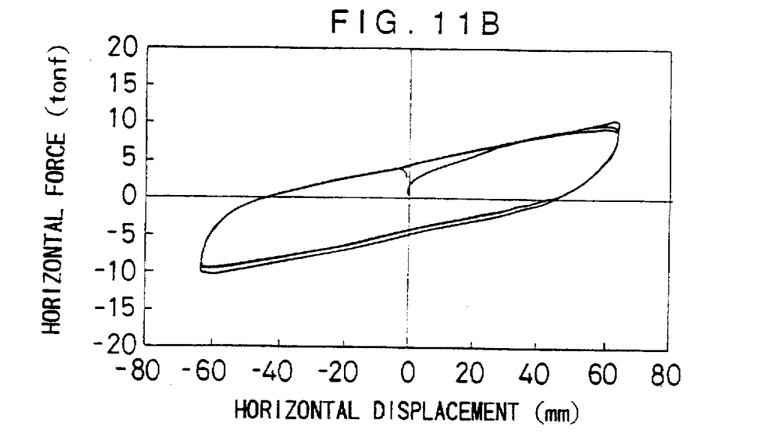
Figure 11C:
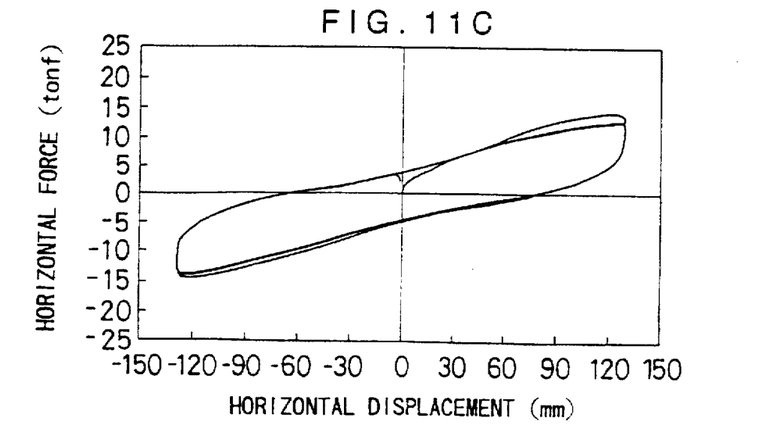
Figure 12A:
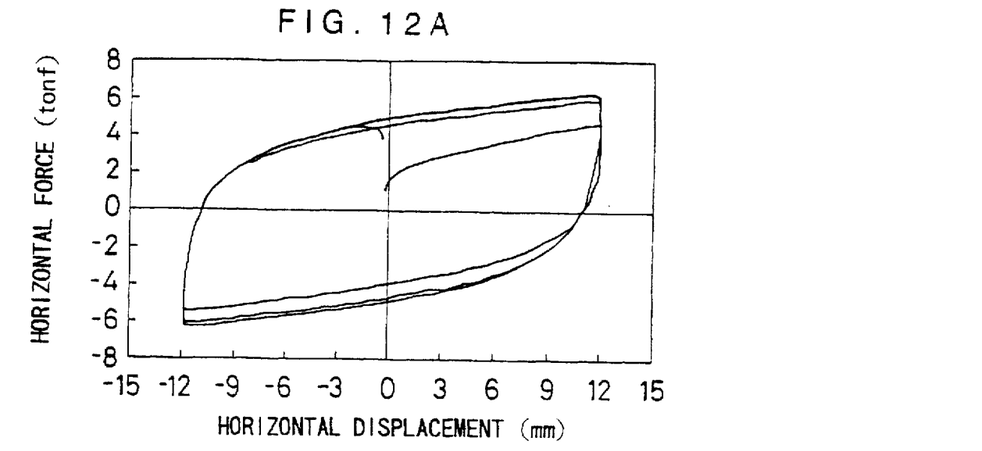
FIG. 12 is a diagram illustrating the effect of the embodiment shown in FIG. 7.
Figure 12B:
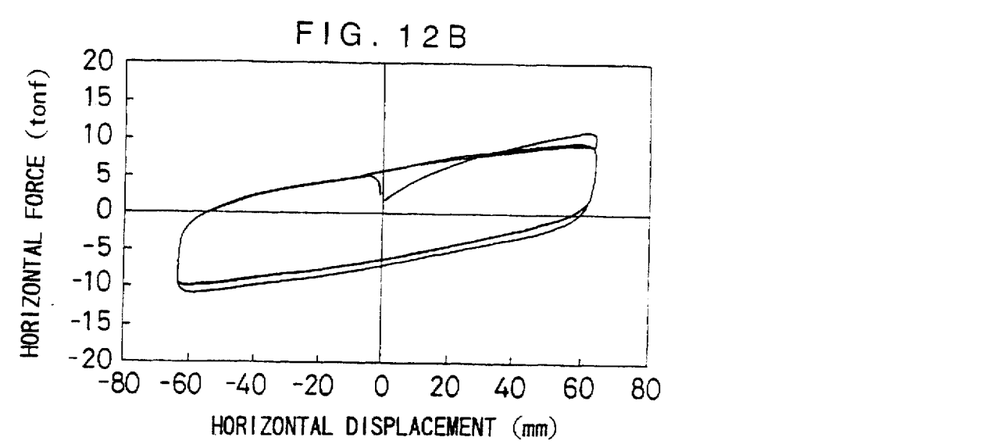
Figure 12C:
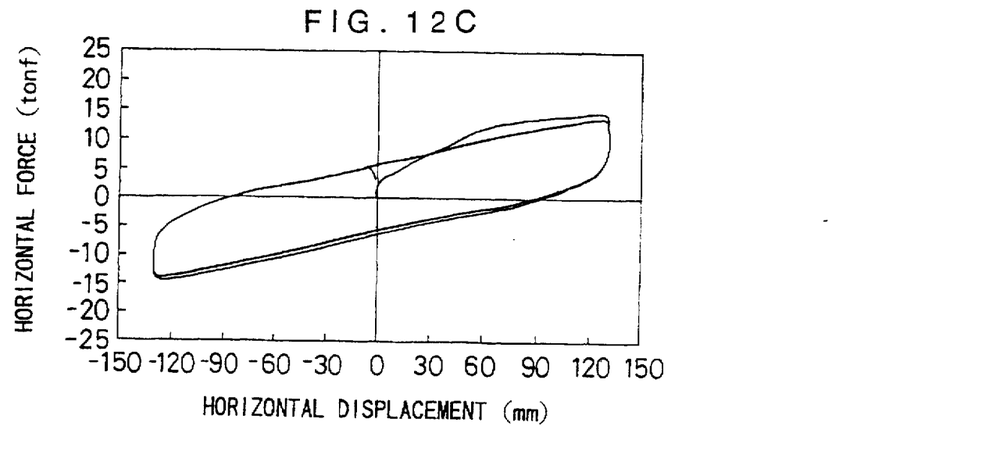

Meanwhile, a normal load of 57 tonf (plane pressure of 30 kgf/cm$^2$) to 342 tonf (plane pressure of 180 kgf/cm$^2$) was applied to the vibration isolating apparatus 5, such as the one shown in FIG. 7, in which the outside diameter of the steel plates 2, 15, and 16 was 500 mm and the inside diameter thereof was 90 mm, and the relationship between the horizontal displacement and the horizontal force was determined by an experiment. This is shown in FIGS. 9 to 12. In FIGS. 9 to 12, (a) shows a case in which the lateral displacement (horizontal displacement) of all the elastic plates 1 of the vibration isolating apparatus 5 was 10%, and (b) and (c) are cases where the lateral displacement thereof was 50% and 100%, respectively. The ratio Vp/Ve in the case where the normal load of 57 tonf (plane pressure of 30 kgf/cm$^2$) was applied as shown in FIG. 9 was 1.03. The ratio Vp/Ve in the case where the normal load of 114 tonf (plane pressure of 60 kgf/cm$^2$) was applied as shown in FIG. 10 was 1.00. The ratio Vp/Ve in the case where the normal load of 228 tonf (plane pressure of 120 kgf/cm$^2$) was applied as shown in FIG. 11 was 1.02. The ratio Vp/Ve in the case where the normal load of 342 tonf (plane pressure of 180 kgf/cm$^2$) was applied as shown in FIG. 12 was 1.111. The ratio ap/Ar in the above cases was 0.03.

As is apparent from FIGS. 9, 11, and 12, in the case where the ratio Vp/Ve is 1.02 or more, it is possible to satisfactorily cope with earthquakes of large amplitude for which the trigger function is particularly required. Further, as is apparent from FIG. 10, in the case where the ratio Vp/Ve is 1.00 to less than 1.02, it can be said that the trigger function cannot be satisfactorily obtained. Incidentally, it was also found that if the ratio Vp/Ve is 1.07 or less, the press-fitting of lead into the hollow portion 12 is facilitated in the manufacture, and not much difficulty is involved. In addition, although an attempt was made to press-fit lead into the hollow portion 12 such that the ratio Vp/Ve became 1.12 or more, it was found that it is difficult to do so without causing damage to the elastic body 3.

Although, in the vibration isolating apparatus 5, the steel plates 15 and 16 and the flange plates 18 and 19 are formed separately, the vibration isolating apparatus may be embodied by forming thick rigid plates integrally with the flange plates 18 and 19.

We claim:

1. A vibration isolating apparatus comprising: a columnar lead member; an elastic body in which an elastic material layer and rigid material layers are alternately superposed one on top of another; and a hollow portion which is defined by at least an inner peripheral surface of said elastic body and in which said columnar lead member is disposed tightly, wherein said rigid material layers include a pair of thick rigid plates which are respectively disposed on both end surface sides of said elastic body, and one end portion of said columnar lead member is disposed tightly in one end portion of the hollow portion, which is defined by an inner peripheral surface of one of said pair of thick rigid plates, while another end portion of said columnar lead member is disposed tightly in another end portion of the hollow portion, which is defined by an inner peripheral surface of another one of said pair of thick rigid plates, and wherein a ratio Vp/Ve between a volume Vp of said columnar lead member disposed in the hollow portion and a capacity Ve of the hollow portion in a state in which said columnar lead member is not inserted and a load is applied to said elastic body is 1.02 to 1.12.

2. A vibration isolating apparatus according to claim 1, wherein the ratio Vp/Ve is 1.02 to 1.07.

3. A vibration isolating apparatus according to claim 1, wherein the inner peripheral surface of said elastic body defining the hollow portion is formed as a concave surface at a position of the elastic material layer as said columnar lead member bites into the elastic material layer of said elastic body.

4. A vibration isolating apparatus according to claim 1, wherein the inner peripheral surface of said elastic body defining the hollow portion is formed as a convex surface at a position of each of the rigid material layers as said columnar lead member bites into the elastic material layer of said elastic body.

5. A vibration isolating apparatus comprising: an elastic body in which an elastic material layer and rigid material layers are alternately superposed one on top of another; and at least one columnar lead member which is disposed in and passed through said elastic body, said columnar lead member being restrained in a shearing direction by said elastic body without a gap such that a shear yield load Qd of said columnar lead member becomes the product of an area ap of a shear plane of said columnar lead member and a design shear yield stress $\Sigma$pd of said columnar lead member, wherein a ratio $\Sigma$ap/Ar between a total area $\Sigma$ap of the shear plane of said columnar lead member and an area Ar of a load surface of said elastic body is in the range of 0.01 to 0.12.

6. A vibration isolating apparatus according to claim 5, wherein the ratio $\Sigma$ap/Ar is in the range of 0.02 to 0.07.

7. A vibration isolating apparatus according to claim 5, wherein the ratio $\Sigma$ap/Ar is in the range of 0.03 to 0.06.

8. A vibration isolating apparatus according to claim 5, wherein said rigid material layers include a pair of thick rigid plates which are respectively disposed on both end surface sides of said elastic body, and one end portion of said columnar lead member is disposed tightly in one end portion of the hollow portion, which is defined by an inner peripheral surface of one of said pair of thick rigid plates, while another end portion of said columnar lead member is disposed tightly in another end portion of the hollow portion, which is defined by an inner peripheral surface of another one of said pair of thick rigid plates.

9. A vibration isolating apparatus comprising: at least one columnar lead member; an elastic body in which an elastic material layer and rigid material layers are alternately superposed one on top of another; and at least one hollow portion which is defined by at least an inner peripheral surface of said elastic body and in which said columnar lead member is disposed tightly, wherein a ratio $\Sigma$ap/Ar between a total area $\Sigma$ap of a shear plane of said columnar lead member and an area Ar of a load surface of said elastic body is in the range of 0.01 to 0.12, and a ratio Vp/Ve between a volume Vp of said columnar lead member disposed in the hollow portion and a capacity Ve of the hollow portion in a state in which said columnar lead member is not inserted and a load is applied to said elastic body is 1.02 to 1.12.

10. A vibration isolating apparatus according to claim 9, wherein the ratio $\Sigma$ap/Ar is in the range of 0.02 to 0.07.

11. A vibration isolating apparatus according to claim 9, wherein the ratio $\Sigma$ap/Ar is in the range of 0.03 to 0.06.

12. A vibration isolating apparatus according to claim 9, wherein the ratio Vp/Ve is 1.02 to 1.07.

13. A vibration isolating apparatus according to claim 9, wherein the inner peripheral surface of said elastic body defining the hollow portion is formed as a concave surface at a position of the elastic material layer as said columnar lead member bites into the elastic material layer of said elastic body.

14. A vibration isolating apparatus according to claim 9, wherein the inner peripheral surface of said elastic body defining the hollow portion is formed as a convex surface at a position of each of the rigid material layers as said columnar lead member bites into the elastic material layer of said elastic body.

15. A vibration isolating apparatus according to claim 9, wherein said rigid material layers include a pair of thick rigid plates which are respectively disposed on both end surface sides of said elastic body, and one end portion of said columnar lead member is disposed tightly in one end portion of the hollow portion, which is defined by an inner peripheral surface of one of said pair of thick rigid plates, while another end portion of said columnar lead member is disposed tightly in another end portion of the hollow portion, which is defined by an inner peripheral surface of another one of said pair of thick rigid plates.

16. A vibration isolating system having at least one vibration isolating apparatus, said vibration isolating apparatus comprising: an elastic body in which an elastic material layer and rigid material layers are alternately superposed one on top of another; and at least one columnar lead member which is disposed in and passed through said elastic body, said columnar lead member being restrained in a shearing direction by said elastic body without a gap such that a shear yield load Qd of said columnar lead member becomes the product of an area ap of a shear plane of said columnar lead member and a design shear yield stress $\Sigma$pd of said columnar lead member, wherein a ratio $\Sigma$ap/$\Sigma$Ar between a total area $\Sigma$ap of the shear plane of said columnar lead member and a total area $\Sigma$Ar of a load surface of said elastic body is in the range of 0.01 to 0.12.

17. A vibration isolating system according to claim 16, wherein the ratio $\Sigma$ap/$\Sigma$Ar is in the range of 0.02 to 0.07.

18. A vibration isolating system according to claim 16, wherein the ratio $\Sigma$ap/$\Sigma$Ar is in the range of 0.03 to 0.06.

19. A vibration isolating system according to claim 16, wherein, in said vibration isolating apparatus, said rigid material layers include a pair of thick rigid plates which are respectively disposed on both end surface sides of said elastic body, and one end portion of said columnar lead member is disposed tightly in one end portion of the hollow portion, which is defined by an inner peripheral surface of one of said pair of thick rigid plates, while another end portion of said columnar lead member is disposed tightly in another end portion of the hollow portion, which is defined by an inner peripheral surface of another one of said pair of thick rigid plates.

20. A vibration isolating system according to claim 16, further comprising at least one other vibration isolating apparatus provided with a solid elastic body in which an elastic material layer and rigid material layers are alternately superposed one on top of another, wherein the total area $\Sigma$Ar of the load surface of said elastic body is a value which includes that of the load surface of said elastic body of said at least one other vibration isolating apparatus.

21. A vibration isolating system having at least one vibration isolating apparatus, said vibration isolating apparatus comprising: an elastic body in which an elastic material layer and rigid material layers are alternately superposed one on top of another; and a columnar lead member which is disposed in at least one hollow portion defined by an inner peripheral surface of said elastic body, wherein a ratio $\Sigma$ap/$\Sigma$Ar between a total area $\Sigma$ap of a shear plane of said columnar lead member and a total area $\Sigma$Ar of a load surface of said elastic body is in the range of 0.01 to 0.12, and a ratio Vp/Ve between a volume Vp of said columnar lead member disposed in the hollow portion and a capacity Ve of the hollow portion in a state in which said columnar lead member is not inserted and a load is applied to said elastic body is 1.02 to 1.12.

22. A vibration isolating system according to claim 21, wherein the ratio $\Sigma$ap/$\Sigma$Ar is in the range of 0.02 to 0.07.

23. A vibration isolating system according to claim 21, wherein the ratio $\Sigma$ap/$\Sigma$Ar is in the range of 0.03 to 0.06.

24. A vibration isolating system according to claim 21, wherein the ratio Vp/Ve is 1.02 to 1.07.

25. A vibration isolating system according to claim 21, wherein in said vibration isolating apparatus, the inner peripheral surface of said elastic body defining the hollow portion is formed as a concave surface at a position of the elastic material layer as said columnar lead member bites into the elastic material layer of said elastic body.

26. A vibration isolating system according to claim 21, wherein in said vibration isolating apparatus, the inner peripheral surface of said elastic body defining the hollow portion is formed as a convex surface at a position of each of the rigid material layers as said columnar lead member bites into the elastic material layer of said elastic body.

27. A vibration isolating system according to claim 21, wherein, in said vibration isolating apparatus, said rigid material layers include a pair of thick rigid plates which are respectively disposed on both end surface sides of said elastic body, and one end portion of said columnar lead member is disposed tightly in one end portion of the hollow portion, which is defined by an inner peripheral surface of one of said pair of thick rigid plates, while another end portion of said columnar lead member is disposed tightly in another end portion of the hollow portion, which is defined by an inner peripheral surface of another one of said pair of thick rigid plates.

28. A vibration isolating system according to claim 21, further comprising at least one other vibration isolating apparatus provided with a solid elastic body in which an elastic material layer and rigid material layers are alternately superposed one on top of another, wherein the total area $\Sigma Ar$ of the load surface of said elastic body is a value which includes that of the load surface of said elastic body of said at least one other vibration isolating apparatus.

* * * * *

UNITED STATES PATENT AND TRADEMARK OFFICE
CERTIFICATE OF CORRECTION

PATENT NO. : 5,761,856
DATED : June 9, 1998
INVENTOR(S) : KISHIZONO et al

It is certified that error appears in the above-identified patent and that said letters patent is hereby corrected as shown below:

Column 13, line 13, delete "$\Sigma pd$" and insert ---$\sigma pd$--.

Column 14, line 18, delete "$\Sigma pd$" and insert --$\sigma pd$--.

Signed and Sealed this

Twentieth Day of October, 1998

*Attest:*

BRUCE LEHMAN

*Attesting Officer*   *Commissioner of Patents and Trademarks*